INVENTOR
BORIS TERLECKY &
BY RICHARD KRAUSE
ATTORNEY

May 18, 1965 B. TERLECKY ETAL 3,183,853
SLIDING FRAME CAR
Filed Oct. 10, 1960 6 Sheets-Sheet 5
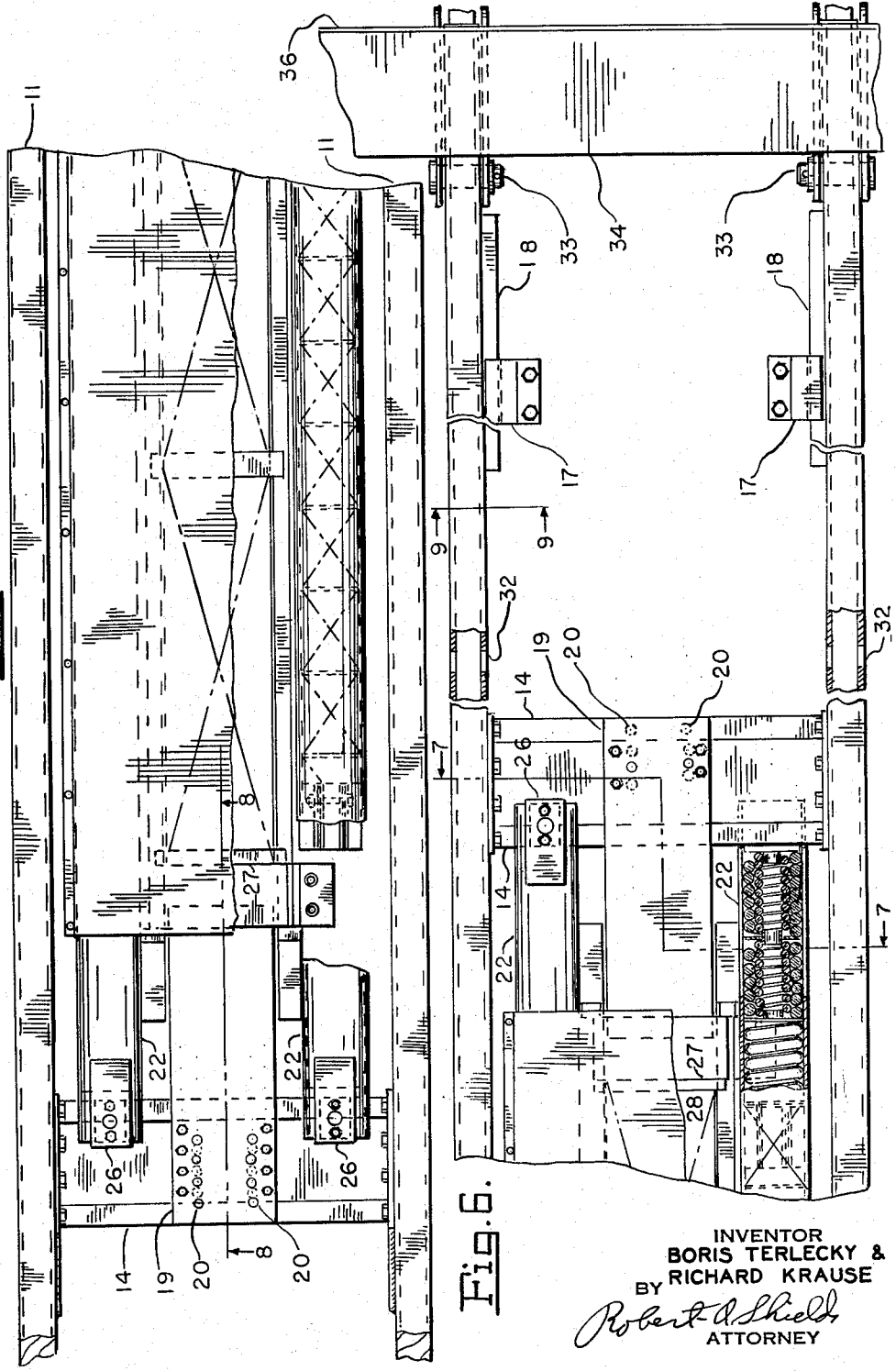
INVENTOR
BORIS TERLECKY &
BY RICHARD KRAUSE
ATTORNEY

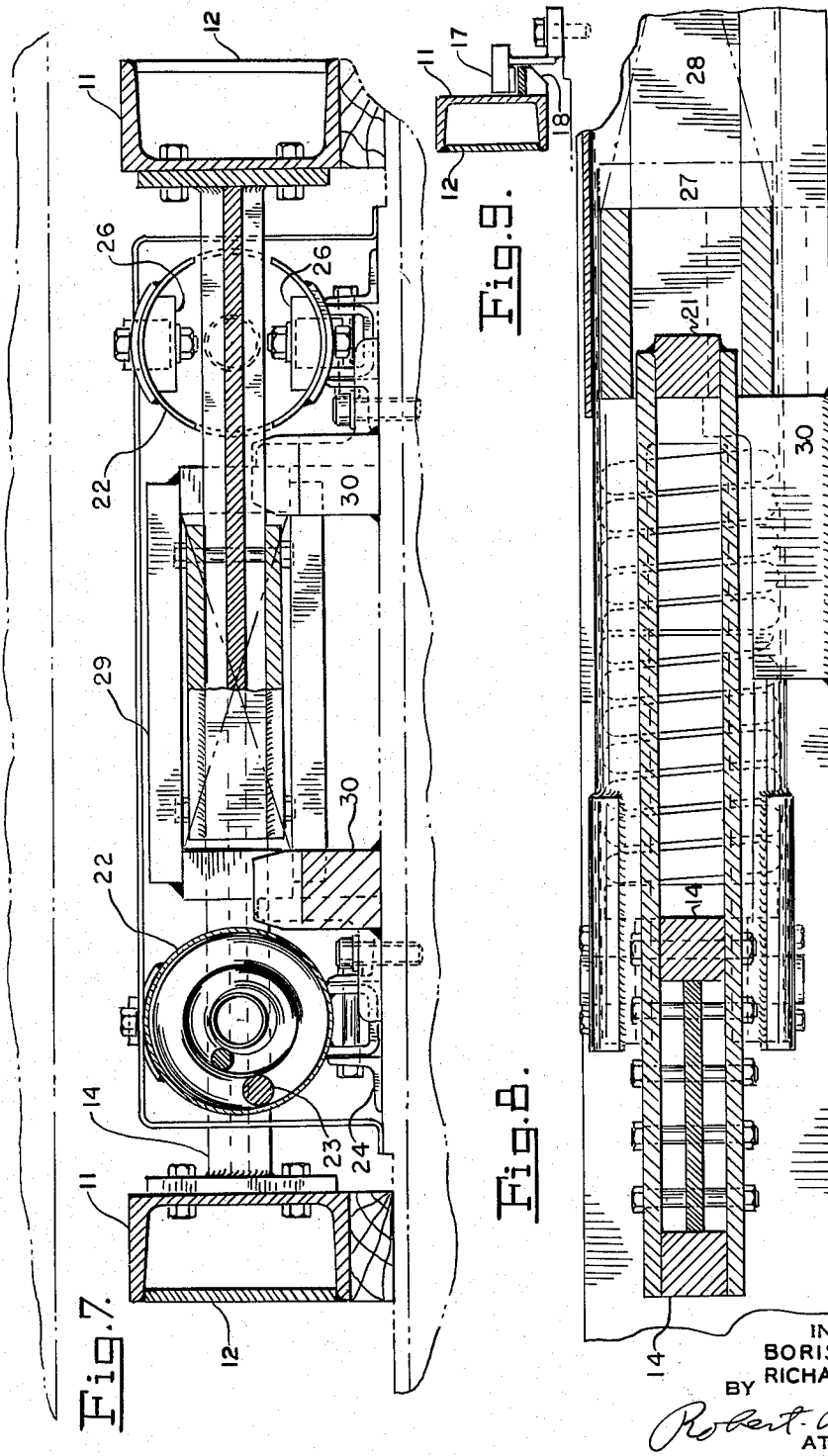

United States Patent Office 3,183,853
Patented May 18, 1965

3,183,853
SLIDING FRAME CAR
Boris Terlecky, New York, N.Y., and Richard Krause, New Brunswick, N.J., assignors to ACF Industries, Incorporated, New York, N.Y., a corporation of New Jersey
Filed Oct. 10, 1960, Ser. No. 61,500
8 Claims. (Cl. 105—368)

This invention relates to railway flat cars, and more particularly to a flat car with a trailer hitch and container mount combination supported on a cushioning device.

The separate trailer hitch and container mounts with their separate cushioning devices presently available are unsatisfactory since they are expensive and not properly cushioned to protect lading against the impact forces produced by buff and draft on the railway car and can not be used in combination on the same car. In addition the devices presently available are not readily adjustable and interchangeable to receive either trailers, containers or both types of lading at the same time.

It is the purpose of this invention to provide an automatic coupling and uncoupling trailer hitch and container anchor combination supported on a cushioned frame that is readily adjustable to receive different type and different size lading or a combination of such lading.

An object of this invention is to provide a flat car with automatic coupling and uncoupling trailer hitch that is easily and automatically extended and retracted to and from a folded position by a tractor loading or unloading a trailer on the flat car.

Another object of this invention is to provide a flat car with a frame supported thereon and carrying an automatic coupling and uncoupling trailer hitch that is easily retracted or folded to a flat position between the frame and also carrying a container mount thereby permitting the car to carry either highway trailers or containers.

A further object of this invention is to provide a versatile frame structure with the combination of trailer hitches and container mounts.

Another object of this invention is to provide a lading carrying frame having cushioning means adaptable to cushion a large range of inertial forces.

Still another object of this invention is to provide a cushioned frame that is easily accessible for service and that is so constructed that it may be easily and completely assembled and disassembled.

These and other objects will be apparent from the description and drawings in which:

FIGURES 5 and 6 are plan views which taken together show the central section of the structure shown in FIGURE 4 and with parts broken away to better show details;

FIGURE 7 is a sectional view showing the cushioning means and taken on line 7—7 of FIGURE 6;

FIGURE 8 is an enlarged sectional side view showing the spring and ram arrangement of the cushioning means taken on line 8—8 of FIGURE 5; and FIGURE 9 is a fragmentary sectional view taken on line 9—9 of FIGURE 6.

Figure 1:
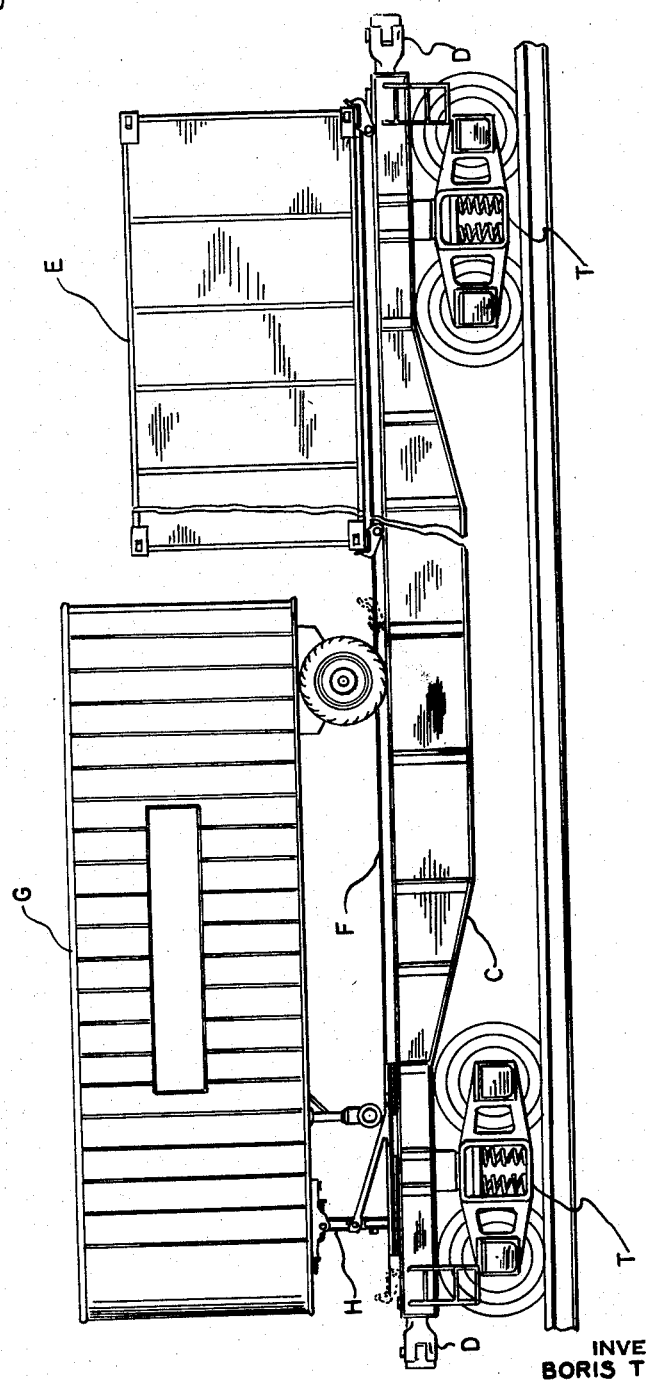
FIGURE 1 is a side view of a flat car with a trailer hitch and container mount combination in accordance with a preferred embodiment of the invention.

Referring now to the drawings in detail, it will be seen that the railway car C is of the fish-belly sill type supported on trucks T and adapted to be shifted by couplers D. The car is of generally conventional form and has mounted thereon a frame F by means of which different ladings such as a highway trailer G or a cargo container E can be anchored for transit. As shown, the car is carrying one highway trailer and one container. However, it will be obvious from the drawings and description that two trailers may be carried or two or more containers. The anchoring devices for the containers and highway trailers are designed to cooperate each with the other and the frame to permit this universal type of lading, carrying and operation.

Figure 3:
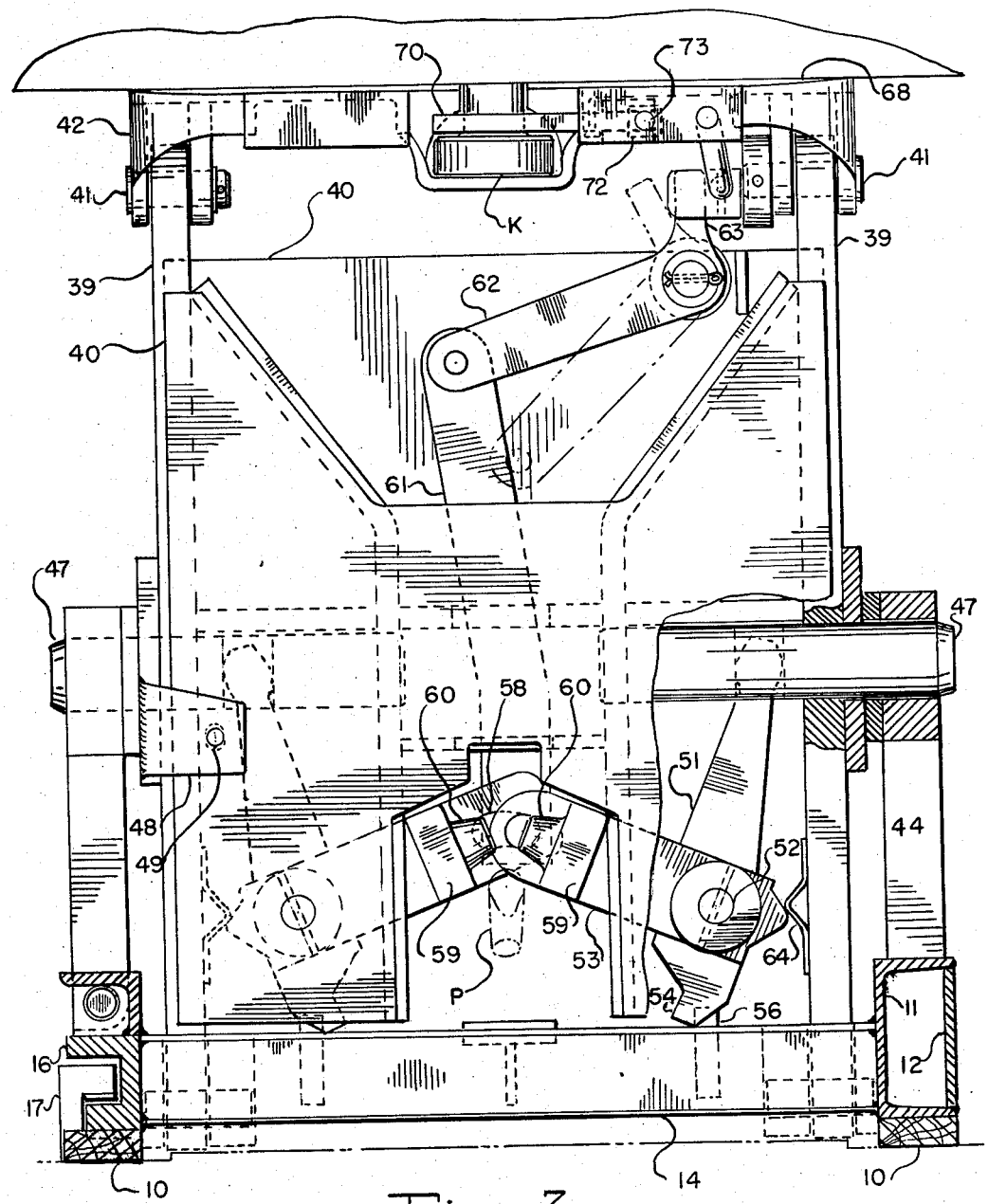
FIGURE 3 is a sectional view taken substantially on line 3—3 of FIGURE 2.

The frame F is mounted on wood or other slides 10 fastened to the top surface of the car and are adapted to support channel form side members 11 reenforced by side plates 12 to form in certain areas box section side members. As clearly shown, the channel sides are spaced apart, yet rigidly connected together by a plurality of cross members 14, which not only serve as ties, but also serve for other purposes, as will be shown later. In order to hold the frame against lateral and vertical movements relative to the car, portions of the channel sides are cut away to receive blocks 16 (FIG. 3) which blocks are not only slidable on the slides, but also are provided with a recess into which the inturned legs of the retainers 17 may extend. These retainers being firmly attached to the car structure thereby preventing both lateral and vertical movement between the car and the frame. While it is preferable to have the retainers at the outer side of the frame sides, they also will be placed inwardly of the frame members as best shown in FIG. 6, in which instance they will engage ledges 18 secured in any manner such as by welding to the frame side members as best shown in FIGS. 6 and 9.

Two of the cross ties 14 will as shown in FIGS. 5 and 6 be spaced a considerable distance apart and to these cross ties will be attached plates 19. Preferably the attachment is by means of bolts adapted to engage offset and stagger holes 20 whereby the position of the plates on the cross ties may be adjusted to thereby modify the action of the cushioning unit later to be described. The plates 19 extend toward each other and are welded together by means of an interposed spacer bar 21 which spacer bar will in effect serve as a ram for imposing load forces on cushioning units carried between the rams. As clearly shown, two tubular members 22 are mounted adjacent the frame sides and inwardly thereof and these tubular members carry therein resilient metallic devices such as springs 23. As best shown in FIG. 7, the tubular members 22 are anchored as at 24 to a base plate member which is attached to the floor of the car. At the ends of the tubes are anchored spaced stops 26 against which followers mounted in the tubes will bear and transmit or receive pressure to and from the springs 23. These followers will bear against the cross ties or members 14 to which the rams are attached and thus will back up or move the followers dependent on direction of movement when load causes relative shift between the frame and the car structure.

As best shown in FIGS. 5, 6 and 8, the ram structures 21 are spaced from followers 27 which are placed at the ends of the cushioning units 28 previously referred to. Preferably, these cushioning units are formed of rubber and mounted within a casing 29. The followers 27 as best shown in FIG. 8 extend to the side of the casing and will engage stops 30 welded or otherwise secured to the base plate.

From the preceding it will be seen that movement of the frame relative to the slides will cause compression first of the metallic springs 23 and then of the non-metallic or rubber cushioning units 28. For example, considering FIGS. 5 and 6 which show the complete cushioning arrangement, movement of the right hand cross ties under action of the frame relative to the car will cause the cross tie 14 to compress the springs 23 within the tubes with their motion being prevented by the stops 26 and followers at the opposite ends of the tubes and due to the attachment of the tubes to the base plate. After springs 23 have been compressed slightly, then the ram shown in FIG. 6 will contact its follower 27 and compress the cushioning units 28 with these units being held by the follower at the opposite end of the units. This follower in turn being held by the stops 30 attached to the base plate. Movement of the cross bars or ties 14 relative to the tubes is permitted by means of slots formed in the ends of the tubes. The degree of compression of springs 23 prior to contact of ram 21 with the cushioning unit 28 can be readily adjusted through the stagger bolt and hole arrangement 20 previously described.

The frame side members in the zones of the box section form are pierced as at 32 to receive pins 33 which pins extend through downwardly extending brackets welded or otherwise secured to cross beams 34. These bars or beams being provided with upturned ends 36 for the purpose of engaging the end walls of containers E. Different size containers can be accomodated by shifting the position of the cross bars or beams relative to the frame and engaging the pins in the proper holes. During times when the car will be used for carrying highway trailers, these cross bars or beams 34 will be removed from the frames and stowed in the space between the cushioning units previously described and the trailer mounting hitch later to be described.

Figure 2:
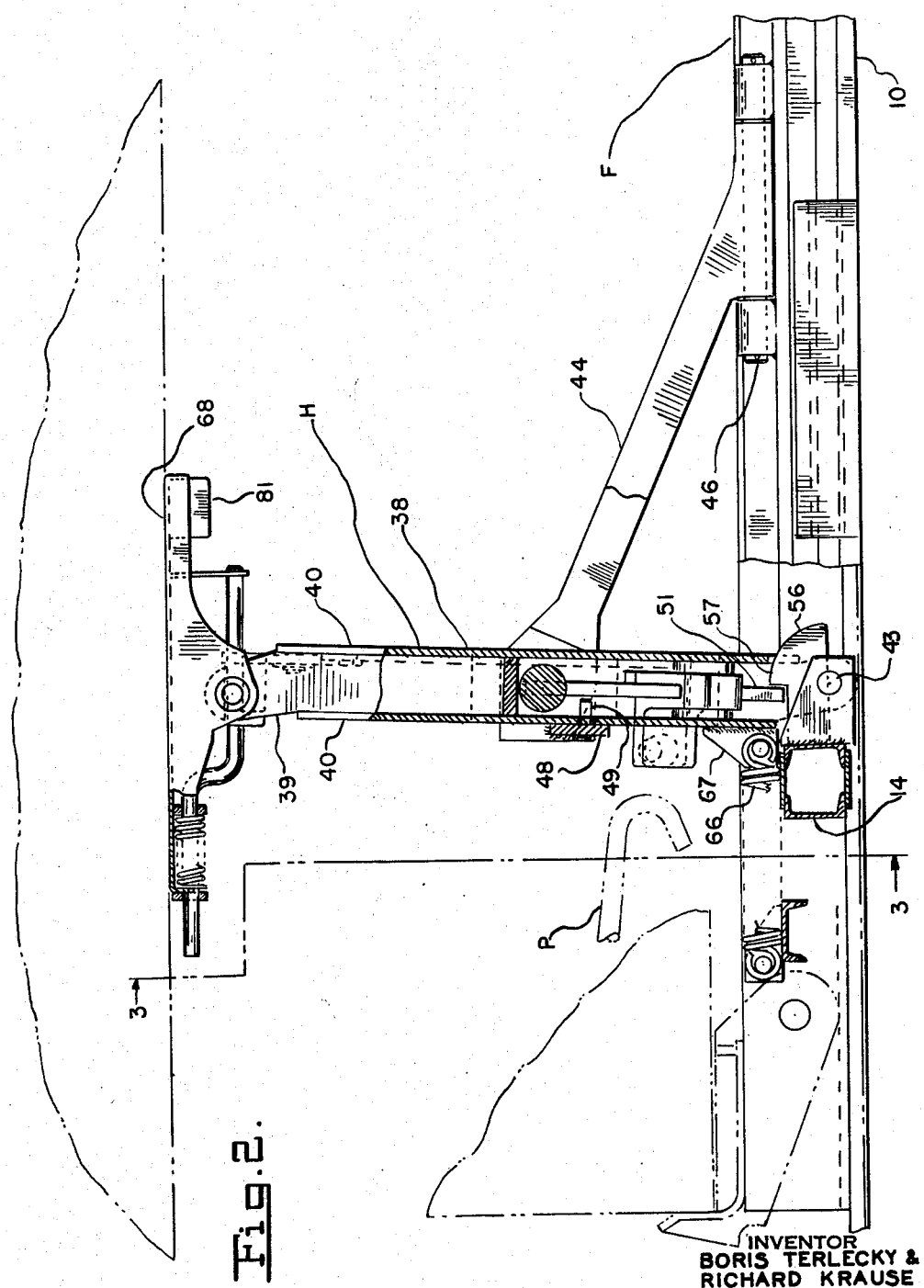
FIGURE 2 is a side view partly in section of the left end portion of the structure shown in FIGURE 1.

In order to accommodate and anchor trailers on the car, the frame F carries a retractable and extensible trailer hitch H. This hitch is preferably of the automatic type which can be raised and lowered by the tractor used to move the trailer and will when in the down-folded position be below the plane of the bottom of the containers that are resting on cross beams 34. The trailer hitch, as shown, is formed with a vertical strut structure 38 made up of side pieces 39 to which are welded spaced plates 40, thereby forming an extremely rigid strut with spaces therein for mounting certain parts later to be described. The upper ends of the side pieces 39 receive pivot pins 41 by means of which a fifth wheel 42 may be pivotally mounted on the strut. The lower ends of the side pieces are pivotally mounted as at 43 to brackets welded or otherwise secured to a heavy box section beam forming one of the cross ties 14, as shown in FIG. 2. In order to hold the vertical strut in its vertical or extended position, diagonal arms 44 are provided having their lower ends offset and bored to receive a longitudinally extending pin 46 mounted in bearings securely welded or otherwise secured to the frame side members 11. By this arrangement, any thrust on arms 44 in either tension or compression will be absorbed by the bearing brackets and not by the pivot pin. The upper ends of arms 44 will in the extended position of the hitch overlap the sides of side pieces 39 and these upper ends are pierced to receive locking pins 47 which arms 44 also carry at their upper ends an inwardly inturned flange 48 to which is attached a locating pin 49 adapted to enter a slightly elongated hole in one of the spaced plates 40 of the vertical strut. In order to operate the locking pins 47, they are engaged by the upper ends of arms 51 pivoted as at 52 for swinging in unison with a laterally extending operating arm 53. The lower ends of pivot members 52 are shaped to provide a ledge shoulder 54. This shoulder during the major portion of the raising and lowering of the hitch will rub against the side of hook shaped cam members 56 rigidly secured to the cross beam or tie adjacent the brackets carrying pivot 43. This hook shaped cam member has a ledge 57 along which the side of the lower end of arm 51 may move, as shown in FIG. 2. The operating arms 53 have their adjacent ends overlapped for a pin and slot connection 58 whereby the arms must move in unison. Each arm adjacent the pin and slot connection is provided with an outstanding projection 59 on which is formed a truncated conical lug 60. These lugs are of such a length that when the operating arms are in the position shown in FIG. 4, they will be substantially in abutment with each other. The pin of the pin and slot connection 58 is connected to the lower end of a pull link 61, the upper end of which is pivotally connected to a bell crank 62 pivoted on one of the plates 40 and having an extended end 63.

Figure 4:
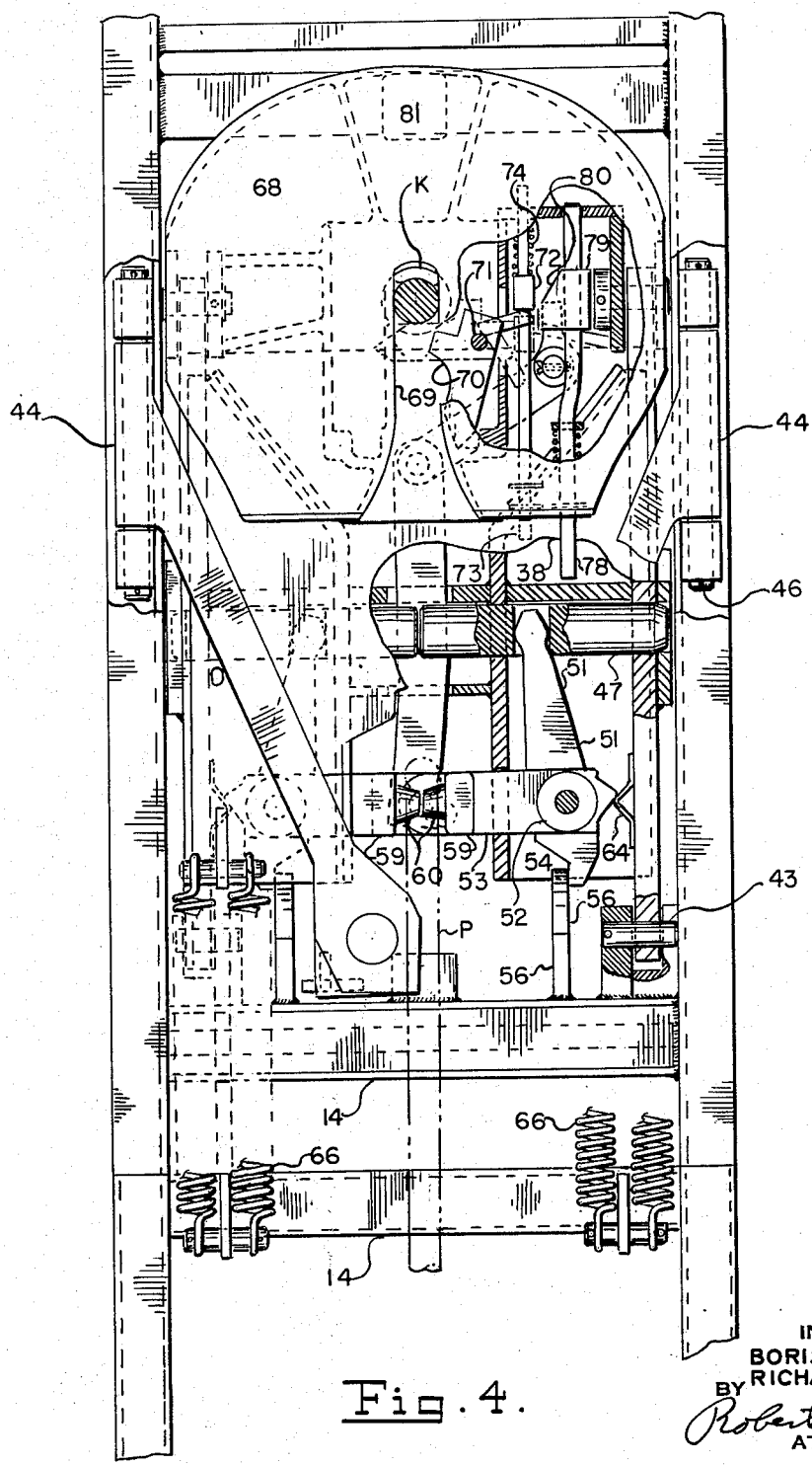
FIGURE 4 is a plan view of the mechanism shown in FIGURE 3 but in a retracted position.

Neglecting for the time being, the equipment that is mounted on the upper ends of side pieces 39, it will be seen that the operating mechanism necessary for erection or retraction of the hitch has been described. For with the parts in the lowered position, as shown in FIG. 4, with the arms 44 lying on top of the vertical strut 38, it will be seen that the conical lugs 60 are substantially in contact. With the parts in this position, if a hook represented as P carried by the tractor is lowered so that its hooked end will engage over the conical lugs, then a movement of the tractor will exert a pull on the lugs. A pull exerted on the lugs will tend to make them separate but they can not separate since the shoulder 54 of arm 51 will be rubbing on the side edge of cam member 56. Accordingly, the vertical strut will have to start moving from a horizontal toward a vertical position. During movement of the strut toward a vertical position, the diagonal arms will have to swing upwardly and outwardly about their longitudinal pivots 46. Continued upward movement of the vertical strut will bring it to a substantially vertical position at which time the flange 48 and location pin 49 will function to hold the diagonal arms in their proper position and at the same time prevent movement of the vertical strut past its proper upright position. Simultaneous with this location of the diagonal arms, with respect to the vertical strut, the shoulder 54 can snap past ledge 57 of the cam member with the result that now the strain on the cam lugs will cause them to separate, releasing the hook P and bringing the parts to the position shown in FIG. 3. In other words, the locking pins 47 will be projected laterally, locking the diagonal arms to the vertical strut and forming a rigid triangular structure rigidly mounted on a sliding frame. In order to prevent these various parts from vibrating either from the position shown in FIG. 4 or the position shown in FIG. 3, the operating arms 53 have their ends forming cam surfaces adapted to snap over the high point of a spring catch member 64 carried by the side pieces 39. Also, to assist in raising the structure, but primarily to resist shock in dropping to the retracted position, counter balance springs 66 are attached at one end to a frame cross member and at the other end to brackets 67 welded or otherwise secured to one of the spaced plates 40 at a point removed from the lower pivot 43. It is to be noted that these springs and their mounting, both extended and contracted, will be below the top plane of the sliding frame F.

The fifth wheel structure or the structure which is adapted to cooperate with the mounting surface on the highway trailer is, as previously noted, pivoted at 41 on the upper ends of the side pieces 39. This fifth wheel structure previously designated 42 is provided with the usual top bearing surface 68 adapted to support the trailer and with an opened slot structure 69 adapted to receive the king pin K integrally attached to the trailer. The king pin will be held in tight engagement in the fifth wheel structure by any suitable lock of the automatic type. For example, as best shown in FIG. 4, this automatic lock may consist of a locking dog 70 movable across the path of the king pin with its movement being that of pivotal action about pin 71. Movement of the locking dog will be prevented by a locking bar 72 fastened on a push rod 73 suitably mounted in the fifth wheel structure and constantly urged toward a locking position by a spring 74. Any suitable trigger means is provided to hold the push rod and the locking dog in the full line position of FIG. 4. With the parts in this position, a king pin K entering the fifth wheel slot will trip the trigger and move the locking dog to its locked position shown in line and double dot position with the locking bar moving also to its line and double dot position and preventing movement of the locking dog.

In order to operate the extended end 63 and bell crank 62 a push rod 78 is provided slidably mounted in the fifth wheel assembly and carrying a block 79 having one tapered face 80 adapted to engage the extended arm 63. In the down position, as shown in FIG. 4, the arm 63 and tapered face 80 will not be in contact since the fifth wheel will be folded relative to the strut approximately 90 degrees from its true position. When, however, the strut is in its vertical position, the fifth wheel member 42 will be in its substantially horizontal position. Any suitable yielding means may be utlized to bring the fifth wheel to a substantially horizontal position during erection of the hitch. It will, of course, be brought to full horizontal position, upon engagement with the trailer mating surface and upon locking of the king pin. As best shown in FIG. 2, the fifth wheel member 42 is provided with a block of rubber or cushion material 81 adapted to strike and rest upon a cross bar, as shown in FIG. 4.

With the hitch in the lowered position of FIG. 4, the trailer and the tractor can back thereover with the operator roughly spotting the king pin in its proper position. The hook P will be lowered by the operator for engagement with the conical lugs 60. The tractor fifth wheel lock will then be released and the driver will start moving out from under the tralier load. A relatively slight forward movement of the tractor relative to the trailer will snap the hitch toward its upright position, as previously described and the tapered slot of the hitch fifth wheel plate will engage with the trailer king pin and automatically lock thereon as described. Simultaneous with this locking, the hitch will have reached its locked position and the tractor hook will automatically release thereby leaving the trailer fully supported on the hitch prior to the time that the tractor fifth wheel has moved fully out from beneath the trailer. In unloading the trailer, the driver merely has to back under the trailer, picking up this part of the load on his fifth wheel and with his continued movement first operating push rod 78 and through the tapered surface 80 and end 63 he will unlock the mechanism moving pins 47 out of the diagonal arms. About the time that this action occurs, the backing tractor will strike push rod 73 and release hitch fifth wheel lock, thereby permitting the whole assembly to drop under control of the counter balance springs to the position of FIG. 4. The driver may then remove the trailer after locking, of course, his tractor carried fifth wheel lock.

From the preceding description, it will be apparent that a convertible railway car has been provided which generally is a flat car upon which is removably mounted a sliding frame held against all motion other than that longitudinally of the car and with the longitudinal motion under control of a resilient means which can be readily disconnected from the car. It will also be apparent that the lading whether it be a container or a highway trailer will be anchored to and under control of the sliding frame which in turn is controlled by the resilient means. In the preferred form shown, the cross beams for carrying the containers may be positioned in any necessary location along the frame. Also the trailer hitch by means of which the trailer is supported and anchored to the frame has been shown as of the automatic type. Obviously it could be of the non-automatic type, the only main requirement being that it be of a type that will fold downwardly to permit passage of trailers and tractors thereover and that in its folded position it does not extend above the supporting surface of the beams supporting the containers. It will also be apparent from the description that various modifications may be made without departing from the scope of the invention as defined by the following claims.

What is claimed is:

1. A cushioning means for cushioning lading carried on a railway car having a flat deck, comprising two spaced apart parallel frame members resting upon and longitudinally slidable on the deck, spring devices supported on the deck between said spaced apart frame members and being operatively connected to said frame members and the deck to resist longitudinal sliding of the frame members on the deck, a rubber cushioning unit also supported between said frame members and operatively connected to said frame and said deck to resist longitudinal sliding of the frame members on the deck, lading supporting devices connected to said frame members and longitudinally slidable therewith, and means connected to said frame members and operable to engage first said spring devices and second said rubber cushioning unit whereby the lading carried on said lading supporting device is cushioned by the frame members sliding on the deck under control firstly of said spring devices and secondly by the spring devices and said rubber cushioning unit acting in parallel.

2. In a flat car lading cushioning means, a plurality of housings extending longitudinally of the car and secured to the car, a slidable frame carried by the car adjacent said housings and longitudinally slidable relative thereto, a first resilient means supported for longitudinal compression within one of said housings, a second resilient means supported for longitudinal compression within another of said housings, cross beams connected to said slidable frame and in position to contact said first resilient means and compress the same, rams connected to said cross beams and extending within the housing of said second resilient means and in position to contact said second resilient means, and an adjusting means operable to adjust the connection of said rams to said cross beams whereby said rams contact said second resilient means at a preselected interval after the contact of said first resilient means by said cross beam.

3. A railway flat car adapted to run on railway tracks and comprising slide surfaces extending longitudinally of and at each side of the top of the car, a frame mounted on the car and including longitudinally extending side frame members slidably supported on said slide surfaces for fore and aft longitudinal movement, cross ties connecting the side frame members at each end portion thereof, a plate member fixed to each of said cross ties medially thereof, said plate members extending inwardly from the cross ties and towards each other, a cushioning element fixed to the car and interposed between the plate members, said cushioning element being normally spaced from the inner ends of said plate members and in alignment therewith for engagement with the plate members upon travel of said frame on said slide surfaces a predetermined distance, casings fixed to and arranged longitudinally of the car body at each side of said plate members, spring means mounted in said casings, follower means for the ends of said spring means in normal engagement with the cross ties for resisting initial movement of said cross ties upon sliding movement of said frame, means for limiting the travel of said frame, and means connected to said frame for supporting and anchoring lading thereto, whereby said lading is protected by said cushioning element and said spring means.

4. The structure of claim 3 characterized in that the casings fixed to and arranged longitudinally of the car body at each side of the plate member are slotted at each end to telescopically receive the adjacent portions of the cross ties.

5. The structure of claim 3 characterized in that the plate members fixed to each of the cross ties medially thereof are provided with a plurality of staggered bolt openings extending in the direction of their length, whereby the plate members may be adjustably connected to the cross ties.

6. The structure of claim 3 characterized in that means connected to the frame for supporting and anchoring lading thereon is movable from an upper position above the frame to a lower position within the frame.

7. The structure of claim 3 characterized in that means are provided on the car for slidably engaging upper surface portions of the side frame members to prevent vertical displacement of the frame on the car.

8. A railway flat car adapted to run on railway tracks and comprising slide surfaces extending longitudinally of and at each side of the top of the car, a frame mounted on the car and including longitudinally extending side frame members slidably supported on said slide surfaces, cross ties connecting the side frame members at each end portion thereof, a pair of plate members adjustably fixed to each of the cross ties medially thereof, said plate members extending inwardly from the cross ties and towards each other, a ram element fixed to the end of each pair of plate members, a cushioning element fixed to the car and interposed between the plate members, said cushioning element being normally spaced from the inner ends of said ram elements and in alignment therewith for engagement thereby upon travel of said frame a predetermined distance, casings fixed to and arranged longitudinally of the car body at each side of said plate members, spring means mounted in said casings, follower means for the ends of said spring means in normal engagement with the cross ties for resisting initial movement of said cross ties upon sliding movement of said frame, means for limiting the travel of said frame, and means connected to said frame for supporting and anchoring lading thereto, whereby said lading is protected by said cushioning elements and said spring means.

References Cited by the Examiner
UNITED STATES PATENTS

| | | | |
|---|---|---|---|
| 1,940,953 | 12/33 | Kellett | 105—392.5 |
| 2,047,955 | 7/36 | Fitch | 105—392.5 |
| 2,410,933 | 11/46 | Freeman | 213—24 |
| 2,458,572 | 1/49 | Dentler | 213—24 |
| 2,656,935 | 10/53 | Danielson et al. | 213—45 |
| 2,767,859 | 10/56 | Fillion | 213—45 |
| 2,783,899 | 3/57 | Gutridge | 214—38 |
| 2,817,445 | 12/57 | Campbell | 213—45 |
| 2,846,172 | 8/58 | Gutridge et al. | 248—185 |
| 2,846,264 | 8/58 | Loomis | 105—366 |
| 2,973,174 | 2/61 | Stanwick et al. | 105—368 |

LEO QUACKENBUSH, *Primary Examiner.*

JAMES SHANK, *Examiner.*